United States Patent [19]

Balters

[11] 4,209,578
[45] Jun. 24, 1980

[54] GALVANIC CELL WITH ALKALINE ELECTROLYTE

[75] Inventor: Helmut Balters, Ellwangen, Fed. Rep. of Germany

[73] Assignee: Varta Batterie Aktiengesellschaft, Hanover, Fed. Rep. of Germany

[21] Appl. No.: 971,303

[22] Filed: Dec. 20, 1978

[30] Foreign Application Priority Data

Dec. 23, 1977 [DE] Fed. Rep. of Germany ....... 2757583

[51] Int. Cl.$^2$ ............................................. H01M 4/34
[52] U.S. Cl. ................................... 429/206; 429/219; 429/248; 29/623.1
[58] Field of Search ..................... 429/219, 248, 206, ; 29/623.1

[56] References Cited

U.S. PATENT DOCUMENTS

| 4,048,405 | 9/1977 | Megahed | 429/219 |
| 4,068,049 | 1/1978 | Naruishi et al. | 429/219 |

*Primary Examiner*—Donald L. Walton
*Attorney, Agent, or Firm*—Weiser, Stapler & Spivak

[57] ABSTRACT

An Ag layer is formed upon an $Ag_2O$ electrode by introducing a chemical reducing agent in such a manner that the transformation takes place after the electrode is already in place in the cell cup.

5 Claims, No Drawings

GALVANIC CELL WITH ALKALINE ELECTROLYTE

The invention relates to a galvanic cell having an alkaline electrolyte and having $Ag_2O$ as a potential determining component of the positive electrode.

The elemental silver which is produced during discharge of silver oxide cells creates an electronically conductive connection between the reaction region, in which there takes place the current productive reduction of the silver oxide into silver, and the positive take-off conductor of the cell. For button cells, the container is simultaneously the positive take-off conductor for the positive electrode.

Formation of the silver makes it unnecessary to add a conductive material to the silver oxide mass and this leads to a substantial volume saving. A small quantity of graphite is added to the mass solely as an aid to tablet formation.

However, since the silver formation starts only with the beginning of discharge, fresh cells in which no discharge products are yet present have a high internal resistance. For button cells of 11.5 millimeter diameter, this amounts, for example, to 30 ohms.

In order that fresh cells may also be placed into operation with immediate good loading characteristics, it has been attempted to improve the conductivity of the positive electrode by coating its surface with an Ag film. Various processes are useful for this purpose.

For example, it is possible to reduce the electrode surface in the finished cell electrochemically by short-circuiting and to activate the cell in this manner. However, this has proven to be a poorly suited method because the short-circuit duration required for the purpose is individually highly variable, as a result of which it is possible that high capacity losses have to be accepted.

In another process, taught in German patent publication (Offenlegungsschrift) No. 2,652,561, the mass tablets are rolled within a reducing bath before being pressed into the container. In so doing the tablets readily fracture. There is also the danger that the Ag layer tears upon pressing in of the tablet. For that reason this Ag layer must be made thicker than would be necessary without this tearing danger. Finally, the surrounding reduction of the tablet which is required by this method inherently transforms more silver oxide into silver than is required for the intended purpose.

In this regard it is more desirable to dip the tablet in the reducing bath only after it has been pressed into the container. This is undesirable only in the sense that the container must subsequently be cleaned.

Accordingly, it is a principal object of the present invention to produce a silver oxide cell which avoids the disadvantages described above and which possesses low internal resistance even in its unused condition.

This and other objects which will appear are achieved in accordance with the invention by providing the positive electrode with a silver layer which is produced by a chemical reducing agent upon the electrode which has previously been built into the cell cup.

Multi-valent phenols acting as reducing agents (general composition: $C_6H_n(OH)_{6-n}$) have shown themselves to be particularly effective in the production of the Ag layer according to the invention. Among their most important examples are the dihydroxy benzenes $C_6H_4(OH)_2$, such as pyrochatecol, resorcinol, hydroquinone and the trihydroxy benzenes, such as pyrogallol, hydroxyhydroquinone, phloroglucinol.

That such reducing agents may be incorporated into silver oxide cells without risk of undesirable side effects has proven to be a great advantage of the invention. As a side effect, there was to be expected a cyclic process which begins with oxidation of the reducing agent at the positive electrode to an oxo compound. This is followed by diffusion of the oxo compound to the negative electrode. There it is reduced with oxidation of negative active material to a hydroxy compound which diffuses to the positive electrode and there restarts a new cycle.

Using p-dihydroxy-benzenes (hydroquinone) as an example, there may be formulated the following process:

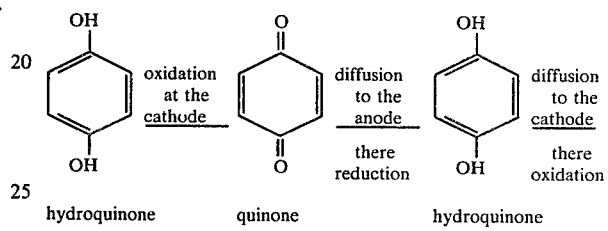

hydroquinone     quinone     hydroquinone

A cyclic process of this type would lead to self discharge of the cell. However, it has been found that such processes, if they take place at all, do so only to an extent which is so slight that the capacity is not appreciably diminished thereby during storage of the cell. The reason for this is not known with certainty. However, it is surmised that the oxidation products (oxo-compounds) mostly change further under the conditions prevailing in the cell, or that the oxidation of the hydroxy-compounds predominantly does not follow the simple scheme described above, but rather leads to higher molecular compounds. In one or the other manner a product results whose diffusion is strongly impeded by the microporous separators which are utilized in silver oxide cells.

Introduction of the reducing agent into the cell may be effected, for example, by dripping it from solution onto the positive electrode after it has been built into its cell half. This creates a certain risk, either that the drop does not flow all the way to the inner wall of the container so that the Ag layer which forms does not contact the container wall and therefore becomes useless, or alternatively, that the inner wall of the container becomes moistened and thereby made unclean to such a height that the sealing of the cell which is equipped with this electrode is impaired unless a cleaning operation follows the reduction.

It is particularly desirable that the reducing agent develops its full effectiveness only in the completely finished closed cell. This can be achieved by coating the separator prior to its introduction into the cell with the reducing agent. Such a procedure is advantageous for several reasons:

Its use is simple. Additional dosing methods or conforming of concentration to cell type (e.g. in dissolving of the reducing agent in the electrolyte or coating of the negative electrode) are eliminated.

Moreover, by facing the separator coating towards the positive electrode, the formation of the Ag layer may be greatly accelerated. If desired, however, the formation of the silver layer can be retarded by facing of the coated side of the separator away from the positive electrode because the reducing agent must, in that case, first diffuse through the separator.

It is also possible to introduce the reducing agent, for example, together with the zinc powder of the negative electrode, into the cell. In this case, the zinc powder is made somewhat pasty with a little electrolyte to which the reducing agent and, if desired, a thickener, have previously been added.

However, as particularly desirable, there is seen the application of the multi-valent phenol to the separator and building of the separator into the cell with orientation of the coated side toward the positive electrode.

The reducing agent is preferably applied to the separator as a solution together with a binder. Suitable binding means are alcohol soluble polyvinylmethylether and carboxyvinylpolymers, suitable solvents are methanol and acetone.

In other respects, the cell provided with the separator coated in accordance with the invention may be produced in any construction known for alkaline silver oxide cells.

The silver oxide mass may contain $Ag_2O$ as the sole active component. However, it may also contain in addition to $Ag_2O$, other active oxides, such as $MnO_2$ or AgO provided it is the $Ag_2O$ which determines the cathode potential.

The active negative mass may contain Zn, Cd, or other metals utilized in alkaline systems. The electrolyte may contain KOH, NaOH or LiOH, as well as ZnO, $SiO_2$, thickening agents or other additives. For fixation of the electrolyte, an absorbing mat may be inserted.

In the cell itself which embodies the invention, the oxidation products of the multi-valent phenol and possibly phenol residue are also present.

As the separator material, which serves as the carrier for the reducing layer, there may be used regenerated cellulose, or synthetic plastic foils, mats, fabrics, or other known materials. The separator may also consist of several layers. In that case, there is preferably coated with the reducing agent, only the layer which is adjacent to the positive electrode.

The cell described in the examples which follow is of the known button cell type with dimensions: height 4.1 millimeters, diameter 11.5 millimeters. As the multi-valent phenols there are used the commercially available compounds:
pyrocatechol (1,2-dihydroxy benzene),
hydroquinone (1,4-dihydroxy benzene)
and pyrogallol (1,2,3-dihydroxy benzene).

EXAMPLE 1.

A coating solution of composition

| | |
|---|---|
| pyrochatecol | 5 g |
| polyvinylmethylether | 0.5 g |
| acetone | 18 g | is applied to cellulose foil. After evaporation of the solvent, the surface weight of the dried coating is approximately 1 mg/cm². The button cell separators stamped out of this material have a surface of about 0.92 cm². The reduction equivalent of the coating then produces approximately 1.7 mg Ag per cell.

Into any given button cell (diameter 11.5 mm, height 4.1 mm) there is built in one coated separator (I) together with a similar but uncoated separator (II) in such a manner that Separator I rests directly upon the positive electrode. During Test 1 its coating is turned toward the positive electrode, in Test 2 the coating is facing away from the electrode (inverted construction). Separator II is positioned upon the side of Separator I facing the negative electrode.

The positive mass of these cells consists of $Ag_2O$ (93%), $MnO_2$ (6%), graphite (1%), and is impregnated with 16 mg of electrolyte per electrode. The space within the cell provided for the negative electrode contains an absorbent mat, amalgamated zinc powder, and electrolyte (ZnO-containing caustic lye).

The success of the invention in reducing the electrode surface can be discerned in the first place by the magnitude and variation with time of internal resistance Ri. This resistance, which is calculated at open voltage and after 0.2 seconds from the voltage with a 39 ohm load, is measured in each case for cells after a storage period of a predetermined duration (d = day, M = month). In addition, the capacities were determined for the same storage periods. In so doing, the test cells were, in each case, discharged 12 hours per day through a resistance of 625 ohms, until a voltage drop to 1.3 volts was reached.

The table which follows and subsequent tables for the next following examples provide a few numerical values for this:

| | Ri after | | | | Capacity after | | |
|---|---|---|---|---|---|---|---|
| | 1d | 1M | 6M | 12M | 1M | 6M | 12M |
| Test 1 Coating toward positive electrode | 6.2 | 8.0 | 8.8 | 5.5 | 128, 134 | 129, 132 | 129, 129 |
| Test 2 Inverted Coating | 38.3 | 9.9 | 9.4 | 5.3 | 129, 130 | 130, 130 | 122, 128 |

From this example it appears that inverted construction of the coated separator leaves the internal resistance still high after one day. Thus, evidently no Ag film has been formed. In contrast, after one month of storage, the internal resistance reaches its normal value. The fact that the capacity values remain almost the same shows that up to 12 months of storage, no self discharge takes place.

In the following examples there are compared cells having an Ag layer which is formed in accordance with the invention through separator coating, with one in which this was done through immersion of the positive electrode in a reducing bath after having been pressed in.

EXAMPLE 2.

The coating solution of

| | |
|---|---|
| hydroquinone | 5 g |
| polyvinylmethylether | 1 g |
| methanol | 14 g | is utilized in the same manner and with approximately the same application strength as described in Example 1 (Test 1). The cell construction is the same as in Example 1, Test 1, except for the somewhat different composition of the positive mass. This contains no graphite, but instead 1% PTFE, and it is impregnated with 13 mg of electrolyte per electrode. The cells of Test 2 contain uncoated separators of the same type and electrodes treated through immersion in reducing solutions. The zinc content, which limits the capacity, is the same in both tests.

|  | Ri (ohm) after | | | | Capacity (mAh) after | | |
| --- | --- | --- | --- | --- | --- | --- | --- |
|  | 1d | 1M | 6M | 12M | 1M | 6M | 12M |
| Test 1, according to invention | 7.3 | 7.0 | 6.5 | 6.2 | 123–126 | 124–125 | 122–126 |
| Test 2, immersion reduction of positive electrode | 11.5 | 7.7 | 5.4 | 4.2 | 124–126 | 125–127 | 122–124 |

EXAMPLE 3.

Composition of the coating solution:

| hydroquinone | 5 g |
| --- | --- |
| carboxyvinylpolymer | 2 g |
| methanol | 48 g |

Application strength, about 0.7 mg/cm$^2$ upon cellulose foil (Test 1), everything else as in Example 2. Test 2 is again with an immersion reduced electrode.

|  | Ri (ohm) after | | | Capacity (mAh) after | |
| --- | --- | --- | --- | --- | --- |
|  | 1d | 1M | 6M | 1M | 6M |
| Test 1, according to invention | 7.5 | 5.7 | 4.7 | 126,128 | 128 |
| Test 2, immersion reduction of positive electrode | 7.5 | 3.8 | 3.2 | 125,128 | 125 |

In examples 2 and 3, the two reducing methods exhibit a divergent variation with time of the internal resistance. However, this cannot be accounted for by the quality of the Ag layer, and does not appreciably affect the cell quality.

The previously given examples pertain to cells whose positive electrode was moistened with the electrolyte prior to being built into the cell. This electrolyte was then available in the finished cell for the reaction between the reducing means and the Ag$_2$O. However, for this purpose there also suffices that electrolyte quantity which permeates the separator from the direction of the negative electrode, as is shown by the following example:

EXAMPLE 4.

Composition of the coating solution:

| hydroquinone | 6 g |
| --- | --- |
| polyvinylmethylether | 2 g |
| methanol | 6 g |
| acetone | 21 g |

This is applied to a composite separator which consists of two layers of a cellulose membrane between which is positioned one layer of a permeable membrane of cross-linked soft polyethylene with grafted methacrylic acid. Application strength about 1 mg/cm$^2$ (Test 1). The positive mass consists of 98% Ag$_2$O, 1% graphite and 1% polystyrene. It is not impregnated with electrolyte.

For Test 2 the electrode is silvered through immersion in a reducing bath. The cell construction corresponds in other respects to the preceding examples.

The internal resistance of the cells, as determined one week after they are manufactured, is almost the same in both tests: 5.2 ohms (Test 1), versus 5.4 ohms (Test 2).

The following example demonstrates the usefulness of pyrogallol as a reducing medium.

EXAMPLE 5.

Composition of the coating solution:

| (Test 1) | | (Test 2) | |
| --- | --- | --- | --- |
| pyrogallol | 5 g | pyrochatecol | 5 g |
| polyvinylmethylether | 0.5 g | polyvinylmethylether | 0.5 g |
| acetone | 10 g | acetone | 7.5 g |

When applied to the same composite separator as in Example 4, the application strength in both tests is about 4 mg/cm$^2$.

The positive mass contains MnO$_2$ (7%), graphite (1%), PTFE (1%), and is impregnated with 12 mg of electrolyte per electrode. All else is the same as in the preceding examples.

|  | Ri after | | | | Capacity after | |
| --- | --- | --- | --- | --- | --- | --- |
|  | 3d | 1M | 6M | 12M | 1M | 12M |
| Test 1 pyrogallol | 7.7 | 9.0 | 8.3 | 7.9 | 98,101,110 | 100,115 |
| Test 2 pyrocatechol | 11.5 | 12.4 | 10.7 | 11.0 | 100,102,112 | 99,110 |

The following example shows that separators of material other than cellulose can also be coated.

EXAMPLE 6.

| hydroquinone | 5 g |
| --- | --- |
| carboxyvinylpolymer | 1 g |
| methanol | 49 g |

With this solution, there is coated a polyamide fabric. Dry weight of the applied layer, about 1.7 mg/cm$^2$. On the anode side of this fabric a cellulose foil is applied as the second separator layer. Mass composition and mass impregnation as in Example 5.

The cell construction is the same as in the previous examples.

| Ri (Ohm) after | | | | Capacity (mAh) after | |
| --- | --- | --- | --- | --- | --- |
| 3d | 1M | 6M | 12M | 1M | 12M |
| 9.6 | 9.2 | 8.2 | 6.6 | 121,127 | 120,121 |

Until now examples have been given only for cells whose negative electrode includes an absorbent mat which binds the major portion of the electrolyte and spaces the zinc mass from the separator.

As the final example, there is described a cell whose electrolyte is thickened at the negative electrode with carboxymethylcellulose and is mixed with the zinc mass.

The absorbent mat can be omitted, the negative mass contacts the separator.

EXAMPLE 7.

Composition of the coating solution:

| hydroquinone | 5 g |
|---|---|
| polyvinylmethylether | 0.5 g |
| methanol | 15 g |

Applied to cellulose foil, dry weight of the coating about 1 mg/cm$^2$. As the second separator layer an uncoated cellulose foil is applied.

Composition of the positive mass as in Example 5, but electrode impregnated with 24 mg of electrolyte.

The electrolyte thickened with carboxymethyl cellulose at the negative electrode is mixed with zinc powder (Test 1). In the parallel test (Test 2) the construction of the negative electrode is the same as in Examples 1 through 6.

|  | Ri (Ohm) after | | | | Capacity (in Ah) after | |
|---|---|---|---|---|---|---|
|  | 1d | 1M | 6M | 12M | 1M | 12M |
| Test 1 | 5.7 | 6.3 | 4.5 | 4.3 | 114,118 | 119,121 |
| Test 2 Negative electrode with unthickened electrolyte, |  |  |  |  |  |  |
| absorbent mat | 6.7 | 6.5 | 5.1 | 4.7 | 126,128 | 124,125 |

I claim:

1. A galvanic cell having an alkaline electrolyte and a positive electrode and which contains Ag$_2$O as potential determining component, characterized in that the positive electrode is provided with a silver layer which is formed through a chemical reducing agent upon the electrode after it has already been built into the cell cup, the chemical reducing agent being applied to the separator.

2. The cell of claim 1, wherein the chemical reducing agent is a multi-valent phenol.

3. The method of producing a cell according to claim 1 which comprises the steps of applying the chemical reducing agent to the separator outside the cell and introducing the agent into the cell together with the separator.

4. The method of claim 3 which includes coating one side of the separator with the chemical reducing agent and positioning the coated side facing the positive electrode upon being introduced into the cell.

5. A galvanic cell having an alkaline electrolyte and a positive electrode and which contains Ag$_2$O as potential determining component, characterized in that the positive electrode is provided with a silver layer which is formed through a chemical reducing agent that is applied to the separator.

* * * * *